United States Patent [19]

Kawai

[11] Patent Number: 4,834,425
[45] Date of Patent: May 30, 1989

[54] PASSIVE SEAT BELT SYSTEM

[75] Inventor: Osamu Kawai, Fujisawa, Japan

[73] Assignee: Nippon Seiko Kabushiki Kaisha, Tokyo, Japan

[21] Appl. No.: 222,753

[22] Filed: Jul. 22, 1988

[30] Foreign Application Priority Data

Jul. 24, 1987 [JP] Japan .................. 62-113662

[51] Int. Cl.$^4$ ............................. B60R 21/10
[52] U.S. Cl. .................. 280/804; 280/806; 297/469
[58] Field of Search ............ 280/802, 804, 806; 297/469

[56] References Cited

U.S. PATENT DOCUMENTS

| 4,223,915 | 9/1980 | Tanaka et al. | 280/804 |
| 4,410,202 | 10/1983 | Takada | 280/804 |
| 4,498,690 | 2/1985 | Takada | 280/804 |
| 4,555,127 | 11/1985 | Kawai | 280/806 |
| 4,703,949 | 11/1987 | Fohl | 280/804 |

FOREIGN PATENT DOCUMENTS 20498  5/1984  Japan .

Primary Examiner—Kenneth R. Rice
Attorney, Agent, or Firm—Wegner & Bretschneider

[57] ABSTRACT

A passive seat belt system is constructed of a guide rail, a slider movable along the guide rail, a force-transmitting member connected to the slider so as to move the slider, a drive unit for driving the force-transmitting member, said drive unit having a rotatable member connected to the force-transmitting member, an acceleration/deceleration sensing mechanism which actuates upon application of an acceleration/deceleration of at least a predetermined value to a vehicle with the passive seat belt system mounted thereon, and a lock device engageable with the rotatable member upon actuation of the sensing mechanism so as to prevent rotation of the rotatable member.

8 Claims, 3 Drawing Sheets

PASSIVE SEAT BELT SYSTEM

BACKGROUND OF THE INVENTION

1. Field of the Invention

This invention relates to a passive seat belt system of the type that after an occupant has sat in a seat, a slider fastened to one end of a restraining webbing runs on a guide rail provided on a vehicle body so as to automatically apply the webbing to the occupant. In particular, the present invention is concerned with a lock device for preventing movement of a slider toward an occupant-releasing side so as to ensure the restraint of an occupant when an acceleration/deceleration of at least a predetermined value is applied to an associated vehicle due to an impact such as a collision.

2. Description of the Related Art

In many of passive seat belt systems of the above sort, a rear portion of the guide rail, said portion being on an occupant-restraining side, is bent downwards with a view toward preventing the slider from moving forward or rearward in the event of a vehicular emergency such as a collision. If the vehicle turns over, a force is however exerted in a vertical direction to the slider so that the slider may be caused to move along the vertical portion of the guide rail and the restraint of the occupant may become incomplete, thereby failing to protect the occupant fully.

If the door should open due to an impact to the vehicle at the time of a collision, the occupant is released from his restraint by the webbing, leading to an accident such that the occupant may be thrown out of the vehicle. A variety of lock devices has therefore been proposed to lock the slider so that the occupant can be maintained in restraint even in such a case as vehicle over-turn or door opening at such a vehicular emergency.

It has conventionally been known, for example, to interlock a stopper, which is associated with an acceleration/deceleration sensing mechanism, with the slider so as to lock the slider directly (U.S. Pat. No. 4,223,915 issued Sept. 23, 1980 to Hideki Tanaka, et al.), to bring a stopper into engagement with a tape-like force-transmitting member adapted to drive the slider, thereby to lock the slider (U.S. Pat. No. 4,555,127 issued Nov. 16, 1985 to Osamu Kawai) or to provide a circuit for preventing a motor from rotating in a direction to move the slider in the occupant-releasing direction upon reception of an electrical signal from the acceleration/deceleration sensing mechanism (Japanese Patent Publication No. 20498/1984 published May 14, 1984 and naming Osamu Ichinose as a sole inventor).

The design that a stopper is brought into engagement with a slider to lock the slider directly is however accompanied by the following drawbacks. Namely, an acceleration/deceleration sensing mechanism must be provided around a B-pillar (an anchor point of a shoulder webbing) of a vehicle. The B-pillar hence extends inside the room of the vehicle, narrows down the room of the vehicle and gives a sort of squeezed feeling to the occupant. In addition, mounting holes are formed in the B-pillar, and a slot through which the stopper operates is also formed through the B-pillar. The strength of the B-pillar is thus reduced, leading to a reduction in the strength of the anchor on the vehicle.

The design that a stopper is brought into engagement with a force-transmitting member is not accompanied by such drawbacks, since the mounting position can be selected rather freely. Upon forward movement of a movable anchor, a slider is pushed forward at a forward end so that a front end switch is actuated to stop the rotation of a motor and the movement of the movable anchor is hence stopped. Until the motor stops subsequent to the actuation of the switch, the force-transmitting member is continuously pushed out of the motor owing to the influence of the inertia of the motor and the like. If it is designed to bear this pushing force 100% at the forward end, a considerable load is applied so that the force-transmitting member may be damaged, for example, at a portion where the movable anchor is pushed. In order to avoid such damages, it is practised to allow the force-transmitting member to flex so as to absorb the force. It is therefore not easy to set the position of installation of the stopper relative to the force-transmitting member which can still move to a certain extent in the longitudinal direction after it is stopped once as described above.

On the other hand, the provision of a control circuit for the control of a motor by an electrical detection signal results in a higher manufacturing cost compared with conventional mechanical means.

SUMMARY OF THE INVENTION

An object of this invention is therefore to solve such problems and to provide a passive seat belt system equipped with an economical and reliable lock device.

In one aspect of this invention, there is thus provided a passive seat belt system comprising:

a guide rail;

a slider movable along the guide rail;

a force-transmitting member connected to the slider so as to move the slider;

a drive means for driving the force-transmitting member, said drive means having a rotatable member connected to the force-transmitting member;

an acceleration/deceleration sensing mechanism which actuates upon application of an acceleration/deceleration of at least a predetermined value to a vehicle with the passive seat belt system mounted thereon; and a lock means engageable with the rotatable member upon actuation of the sensing mechanism so as to prevent rotation of the rotatable member.

In the passive seat belt system according to this invention, the rotatable member is driven by the drive means in order to drive the force-transmitting member and hence to cause the slider to run. The lock means actuated by the acceleration/deceleration sensing mechanism mechanically prevents rotation of the rotatable member in the occupant-releasing direction. Unlike conventional systems featuring direct locking of a slider, the system of this invention is free from such drawbacks that a B-pillar extends inside a room of a vehicle to give a sort of squeezed feeling to an occupant and the strength of a vehicle body is reduced by holes formed in the B-pillar. Different from conventional systems featuring locking of a force-transmitting member, the reliability of locking is not affected by the position of installation of the lock means in the passive seat belt system according to this invention. In addition, the system of this invention uses the simple mechanism. Accordingly, it does not require expensive components such as those needed for the electrical control of a motor and can thus be manufactured at a low cost.

BRIEF DESCRIPTION OF THE DRAWINGS

The above and other objects, features and advantages of the present invention will become from the following description of the invention and the appended claims, taken in conjunction with the accompanying drawings, in which:

DETAILED DESCRIPTION OF THE INVENTION AND PREFERRED EMBODIMENTS

Figure 4:
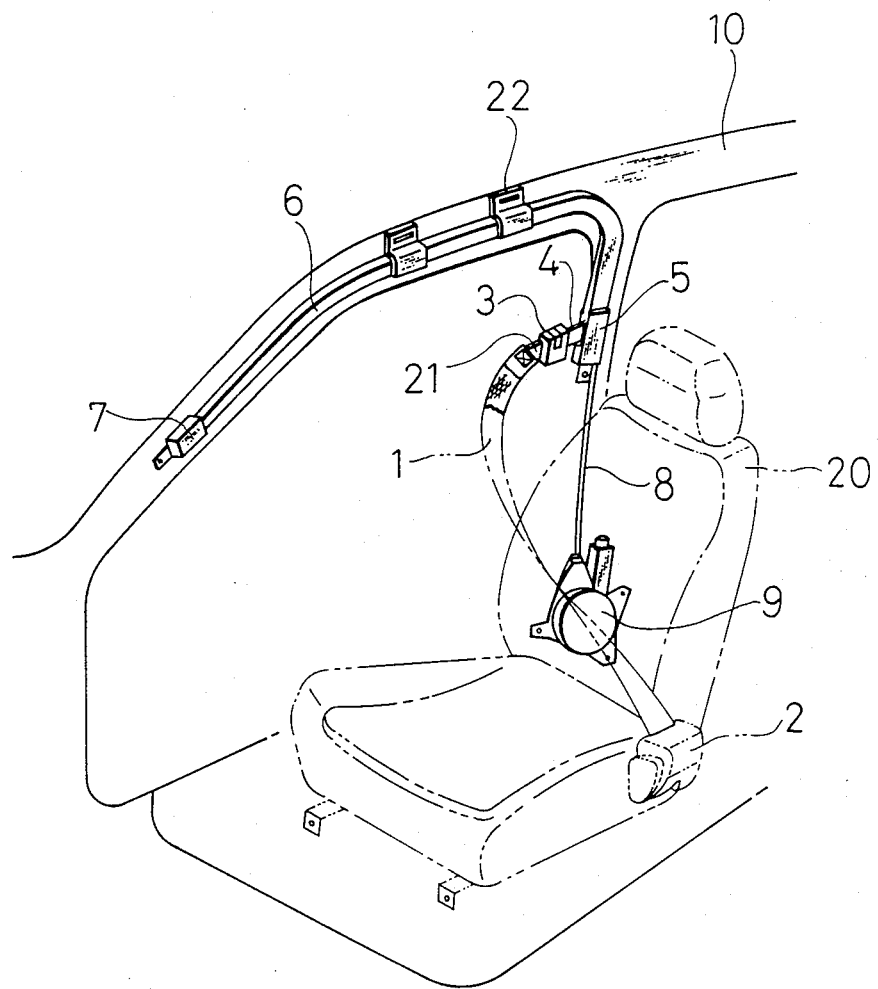
FIG. 4 is an overall perspective view showing the passive seat belt system of FIG. 1.

Referring first to FIG. 4, numeral 1 indicates a webbing which has been taken up at an inner end portion thereof in a retractor 2. Preferably, a retractor of the type that the webbing is locked in the event of a vehicular emergency such as a collision may be used as the retractor 2. An outer end portion of the webbing 1 is fastened to a slider 4 by way of an end fitting 3 such as an emergency release buckle. The slider 4 runs between an occupant-restraining end portion 5 and an occupant-releasing end portion 7 on a guide rail 6 inside a room of a vehicle, whereby an occupant is automatically restrained or released in accordance with each riding or getting-off of the occupant such as opening and closure of an associated door. A rod-like force-transmitting member 8 for causing the slider 4 to run extends through the guide rail 6 and is driven by a pulley rotated by an unillustrated motor. The pulley is located inside a drive means 9 and not shown in the drawing.

Figure 1:
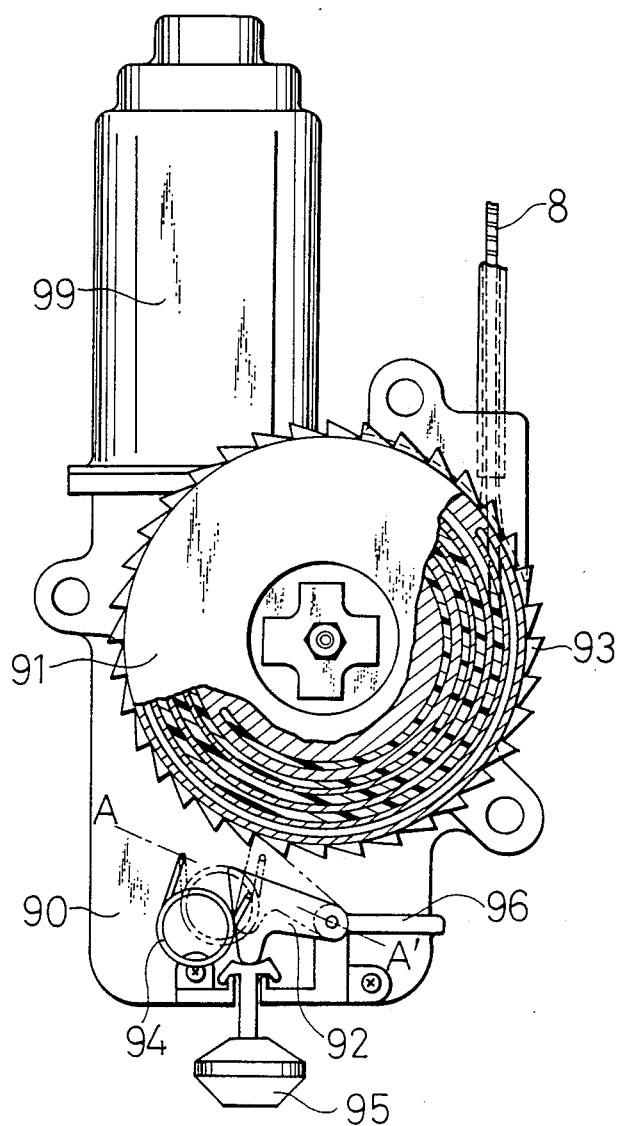
FIG. 1 is a fragmentary front view of a passive seat belt system according to one preferred embodiment of this invention.
Figure 2:
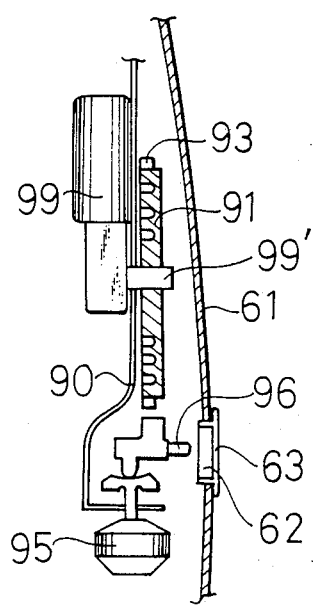
FIG. 2 is a fragmentary side view of the passive seat belt system.

The passive seat belt system according to the first embodiment of this invention will next be described with reference to FIGS. 1 and 2. On an outer periphery of a pulley 91 mounted on a drive shaft 99' of a motor 99 and adapted to drive the force-transmitting member 8, teeth 93 are provided in such a way that a pawl 92 is engageable with one of the teeth 93 when the pulley 91 rotate in an occupant-releasing direction, namely, in a direction that the force-transmitting member 8 is paid out. The teeth 93 and pawl 92 therefore makes up a ratchet. One end of a toggle spring 94 is connected at one end thereof to an end portion of the pawl 92, which end portion is opposite to a fulcrum where the pawl is fixed on a bracket 90. The other end of the toggle spring 94 is fixed on the bracket 90. By the toggle spring 94, the pawl 92 is normally biased in a direction away from the periphery of the pulley 91. A lower end portion of the pawl 92, which is opposite to the portion where the pawl 92 engages one of the teeth 93, is in contact with a pendulum 95 constituting an acceleration/deceleration sensing mechanism. Incidentally, the toggle spring 94 serves to perform such functions as will be described subsequently. It is not absolutely required. Even without the pendulum 95, the pawl 92 is also maintained normally in a state that it rests by its own weight on a head portion of the pendulum 95.

When an acceleration or deceleration of at least a predetermined value is applied by an impact such as a collision, the pendulum 95 is caused to swing so that the pawl 92 is lifted against the outer peripheral face of the pulley 91. As a consequence, the pawl 92 engages one of the teeth 93 on the outer periphery of the pulley 91, thereby preventing the pulley 91 from turning in the occupant-releasing direction. If the pawl 92 and toggle spring 94 are arranged to have the point of connection between the pawl 92 and the toggle spring 94 located beyond a line A—A' extending between the fixed end of the pawl 92 and that of the toggle spring 94 at a position that the pawl 92 engages one of the teeth 93 as shown in the drawing, the pawl 92 is pressed against the outer periphery of the pulley by the toggle spring 94. Accordingly, the pawl 92 is allowed to maintain its state of engagement with one of the teeth 93 in the outer periphery of the pulley 91 even when the pendulum 95 stops its swinging motion and extends downwardly.

If it is designed to maintain the lock device in its operated state once the lock device has operated as described above even after the acceleration or deceleration becomes smaller than the predetermined value and is no longer sensed, the restraint by the webbing is maintained even when the door opens due to an impact such as a collision. It is hence possible to more surely prevent an accident such that the occupant is thrown out of the vehicle.

It is desirable to provide the lock device with a manual lever designated at numeral 96 in the drawings. The manual lever 96 makes it possible to release the pawl 92 from its engagement with one of the teeth 93. When the door is slammed by way of example, an acceleration of a value much greater than that expected may be applied to the vehicle so that the acceleration/deceleration sensing mechanism is actuated to operate the lock device and the seat belt system can no longer function. When the lock device is operated as described above although its operation is not needed, the locked state can be easily released without need for disassembly of the lock device but with the lock device kept in the state assembled on the vehicle and the function of the seat belt system is restored, provided that it is designed to permit disengagement of the pawl 92 from the teeth 93 by forming a hole 62 through a trim 61 as depicted in FIG. 2, inserting fingers through the hole 62 and moving the manual lever 96. Incidentally, it is preferable to cover the hole 62 by a suitable cover 63 when the hole 62 is not used. Although the teeth 93 are formed in the entire outer periphery of the pulley 91 in the illustrated embodiment, it is unnecessary to form them in the entire outer periphery. It is possible to provide teeth only in a portion of the outer periphery of the pulley so that the pawl 92 is allowed to engage one of the teeth only when the slider is located near the occupant-restraining end portion 5 on the guide rail 6 (see FIG. 4). This saves labor compared with the formation of teeth in the entire periphery, whereby the manufacturing cost is reduced. In addition, even when an acceleration or deceleration is sensed for a cause other than a vehicular emergency such as a collision and the lock device is operated while the slider is running toward the front of the vehicle, namely, toward the occupant-releasing end 7 (see FIG. 4), there is no tooth available for engagement with the pawl 92 and where the toggle spring 94 is not provided as mentioned above, the pawl 92 drops by its own weight so that the slider is not stopped in the course of its frontward movement and the seat belt system is rendered more convenient.

Figure 3:
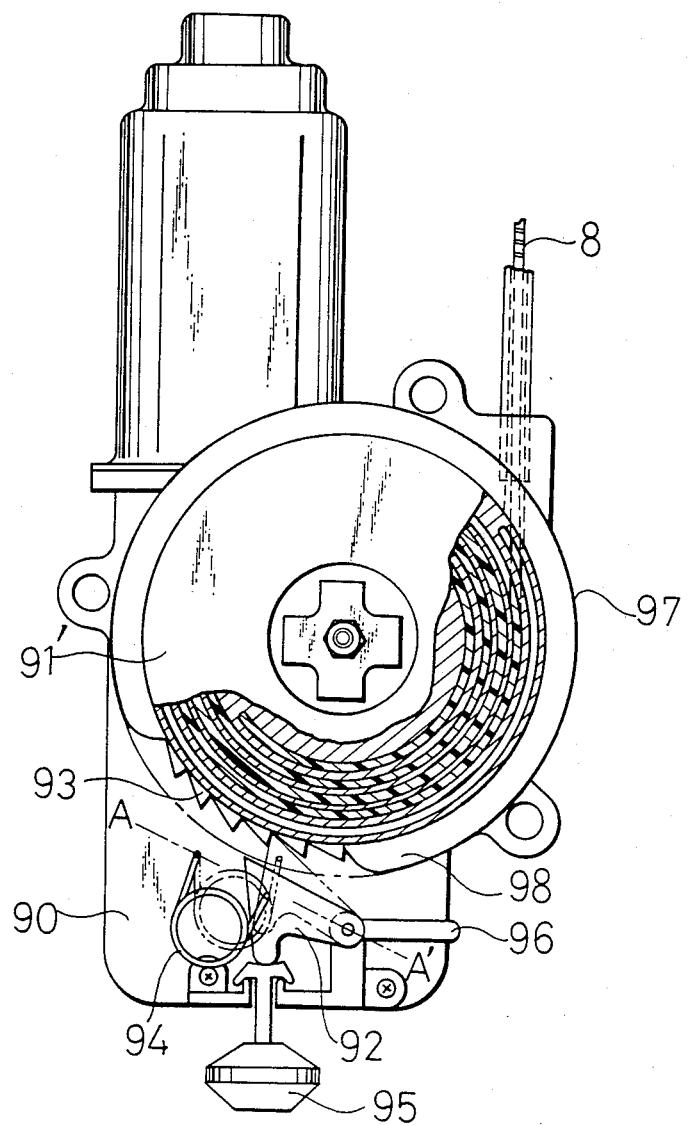
FIG. 3 is a fragmentary front view of a passive seat belt system according to another preferred embodiment of this invention, in which a lock means is maintained inoperative while locking of a slider is not needed.

FIG. 3 illustrates another embodiment in which the lock device is brought back to its inoperative position when it is operated while the slider is not located near the occupant-restraining position 5, in other words, while the locking is not required. In this embodiment, the outer periphery of a pulley 91' is formed with a greater radius at an occupant-restraining portion with teeth formed therein. Thus, a face capable of contacting the pawl 92 so as to prevent the point of connection between the pawl 92 and toggle spring 94 from moving beyond line A—A' extending between the fixed ends of the pawl 92 and toggle spring 94 is formed on the outer periphery of the pulley 91'. The face will hereinafter be called a "large-radius portion". Even if the pendulum 95 is actuated for one or another reason and the pawl 92 is pressed against the outer peripheral face of the pulley 91' while the occupant is not restrained, the pawl 92 is brought into contact with the large-radium portion 97 on the outer periphery of the pulley 91' other than the teeth 93 so that the toggle spring 94 continues to bias the pawl 92 toward a non-engagement position. When the acceleration or deceleration thus sensed is eliminated and the pendulum 95 is rendered standstill, the pawl 92 is allowed to return to the non-engagement position as the pulley 91' rotates and is thus kept out of engagement with any one of the teeth 93. Even when an acceleration or deceleration happens to occur when the toothed outer peripheral portion of the pulley 91' is located opposite to the pawl 92 and the pawl 92 is hence brought into engagement with one of the teeth 93, the pawl 92 is allowed to return to its non-engagement position by closing the door, namely, by reversing the pulley 91'.

Similar effects can also be achieved by providing a cam similar to that designated at numeral 98 at one location only. The pawl 92 is caused to return to its non-engagement position by the cam 98 before it engages one of the teeth 93.

I claim:

1. A passive seat belt system comprising:
   a guide rail;
   a slider movable along the guide rail;
   a force-transmitting member connected to the slider so as to move the slider;
   a drive means for driving the force-transmitting member, said drive means having a rotatable member connected to the force-transmitting member;
   an acceleration/deceleration sensing mechanism which actuates upon application of an acceleration/deceleration of at least a predetermined value to a vehicle with the passive seat belt system mounted thereon; and
   a lock means engageable with the rotatable member upon actuation of the sensing mechanism so as to prevent rotation of the rotatable member.

2. The system as claimed in claim 1, wherein teeth are formed in an outer periphery of the rotatable member and the lock means is engageable with at least one of the teeth.

3. The system as claimed in claim 2, wherein the teeth are formed only in a part of the outer periphery of the rotatable member.

4. The system as claimed in claim 3, wherein a webbing is connected to the slider, the slider is movable between an occupant-restraining position and an occupant-releasing position, and the teeth is formed in the outer periphery of the rotatable member only at a portion opposing the lock means when the slider is at the occupant-restraining position.

5. The system as claimed in claim 3, wherein the remaining portion of the periphery of the rotatable member, other than the portion in which the teeth are formed, is formed as a large-radius portion having a radius greater than an imaginary circle drawn by tips of the teeth.

6. The system as claimed in claim 1, further comprising a spring means connected to a portion of the lock means so as to selectively bias the lock means in a direction where the lock means is brought into engagement with the rotatable member or is maintained out of engagement with the rotatable member.

7. The system as claimed in claim 6, further comprising a cam provided on the outer periphery of the rotatable member so that the lock means, which has been biased and brought into engagement with the rotatable member, is brought to a position where the lock means is biased and maintained out of engagement with the rotatable member.

8. The system as claimed in claim 1, further comprising a manual means for permitting forced release of the lock means from the rotatable member.

* * * * *